(12) United States Patent
Hewitt et al.

(10) Patent No.: US 12,427,081 B2
(45) Date of Patent: Sep. 30, 2025

(54) WIDE SWEEP CANE

(71) Applicant: INTERNATIONAL BUSINESS MACHINES CORPORATION, Armonk, NY (US)

(72) Inventors: Trudy L. Hewitt, Cary, NC (US); Mauro Marzorati, Lutz, FL (US); Carolina Garcia Delgado, Zapopan (MX); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 18/337,107

(22) Filed: Jun. 19, 2023

(65) Prior Publication Data
US 2024/0415725 A1    Dec. 19, 2024

(51) Int. Cl.
*A61H 3/06* (2006.01)
*G01S 13/60* (2006.01)
*G01S 13/86* (2006.01)

(52) U.S. Cl.
CPC .............. *A61H 3/061* (2013.01); *G01S 13/60* (2013.01); *G01S 13/86* (2013.01); *A61H 2003/063* (2013.01); *A61H 2201/5064* (2013.01)

(58) Field of Classification Search
CPC .............. A61H 3/061; A61H 2003/063; A61H 2201/5064; A61H 3/068; A61H 2201/5058; A61H 2201/5084; A61H 2201/5092; A61H 2201/5097; G01S 13/60; G01S 13/86; G01S 13/50; G01S 13/88
See application file for complete search history.

(56) References Cited

U.S. PATENT DOCUMENTS 8,077,020 B2 * 12/2011 Behm .................... A61H 3/061
                                                        342/24
8,922,759 B2 * 12/2014 Gassert .................. A61H 3/068
                                                        356/3.01
(Continued)

FOREIGN PATENT DOCUMENTS

BR    102012020647 A2  *  6/2014
CN       208958695 U   *  6/2019
(Continued)

OTHER PUBLICATIONS

Translation of BR 102012020647 (Year: 2014).*
(Continued)

*Primary Examiner* — Daniel Pihulic
(74) *Attorney, Agent, or Firm* — Caleb D. Wilkes

(57) ABSTRACT

A cane for increased sweep coverage includes a first time-of-flight (TOF) sensor, a haptic feedback generator and a processor. The first TOF sensor is disposed at a first end of the cane and is configured to emit a first TOF beam. The haptic feedback generator is disposed towards a second end of the cane that is distally opposite from the first end of the cane. The processor is configured to receive signal data from the first TOF sensor, determine, based on the received signal data, whether an obstacle is present within the first TOF beam, and activate the haptic feedback generator in a first haptic feedback pattern in response to the processor determining that the obstacle is present. A method for using the cane to detect obstacles is also provided.

20 Claims, 7 Drawing Sheets

(56) References Cited

U.S. PATENT DOCUMENTS

| | | | | |
|---|---|---|---|---|
| 10,537,490 | B2 | 1/2020 | Rizzo | |
| 2010/0007474 | A1* | 1/2010 | Behm | A61H 3/061 |
| | | | | 340/407.1 |
| 2013/0220392 | A1* | 8/2013 | Gassert | A61H 3/068 |
| | | | | 135/66 |
| 2024/0161603 | A1* | 5/2024 | Marzorati | G08G 1/0175 |
| 2024/0415725 | A1* | 12/2024 | Hewitt | G01S 13/88 |
| 2025/0005652 | A1* | 1/2025 | Marzorati | G06Q 30/0639 |
| 2025/0061176 | A1* | 2/2025 | Hewitt | G06F 21/31 |

FOREIGN PATENT DOCUMENTS

| | | | | |
|---|---|---|---|---|
| CN | 110575370 | A | * 12/2019 | |
| EP | 3109668 | A1 | 12/2016 | |
| EP | 4167196 | A1 * | 4/2023 | A61H 3/061 |
| JP | 2006204667 | A * | 8/2006 | |
| KR | 20170053061 | A * | 5/2017 | |
| KR | 101773592 | B1 * | 8/2017 | |
| SA | 119400814 | A * | 9/2019 | |
| WO | WO-2023061927 | A1 * | 4/2023 | A61H 3/061 |

OTHER PUBLICATIONS

Translation of KR 20170053061 (Year: 2017).*

Authors Unknown, "Environmental and Hazard Detection Using a Portable Apparatus," IP.com Prior Art Database Technical Disclosure, IP.com No. IPCOM000177547D, Dec. 17, 2008, 3 pages.

Elsonbaty, "Smart Blind Stick Design and Implementation," International Journal of Engineering and Advanced Technology (IJEAT) ISSN: 2249-8958, vol. 10 Issue-5, Jun. 2021, pp. 17-20.

IBM, "IBM Accessibility", Accessed: May 4, 2023, https://www.ibm.com/able/about.html, 1 page.

Nada et al., "Effective Fast Response Smart Stick for Blind People," Conference: Second International Conference on Advances in Bio-Informatics and Environmental Engineering—ICABEE 2015, Apr. 2015, https://www.researchgate.net/publication/273452928_Effective_Fast_Response_Smart_Stick_for_Blind_People, 8 pages.

Wikipedia, "White cane", Wikipedia—The Free Encyclopedia, Accessed: May 4, 2023, https://en.wikipedia.org/wiki/White_cane, 5 pages.

* cited by examiner

WIDE SWEEP CANE

BACKGROUND

The present invention relates generally to devices for assisting individuals with sight disabilities. Blind people have used handheld canes extended in front of themselves to check for any obstacles in a walking area ahead of them. A white cane is distinguished by its white color so that onlookers are able to identify and recognize a user of the white cane as being blind or visually impaired. If an onlooker recognizes that another person is using a white cane, the onlooker is better able to apply appropriate care for walking near or by the white cane user or for further interacting with the visually-impaired cane user.

SUMMARY

According to one exemplary embodiment, a cane for increased sweep coverage includes a first time-of-flight (TOF) sensor, a haptic feedback generator, and a processor. The first TOF sensor is disposed at a first end of the cane and is configured to emit a first TOF beam. The haptic feedback generator is disposed towards a second end of the cane that is distally opposite from the first end of the cane. The processor is configured to receive signal data from the first TOF sensor, determine, based on the received signal data, whether an obstacle is present within the first TOF beam, and activate the haptic feedback generator in a first haptic feedback pattern in response to the processor determining that the obstacle is present. A cane sweeping method performed with the above described cane is also described herein.

According to another exemplary embodiment, a method for cane sweeping includes receiving signal data from a first sensor connected to a cane. The received signal data is analyzed via a processor of the cane to determine a direction of movement of the cane. Based on the determined direction of movement of the cane, one of multiple time-of-flight (TOF) sensors disposed with the cane is selected for firing. Received TOF signal data from the one of the TOF sensors is used to detect an obstacle within a path of the cane.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1A:
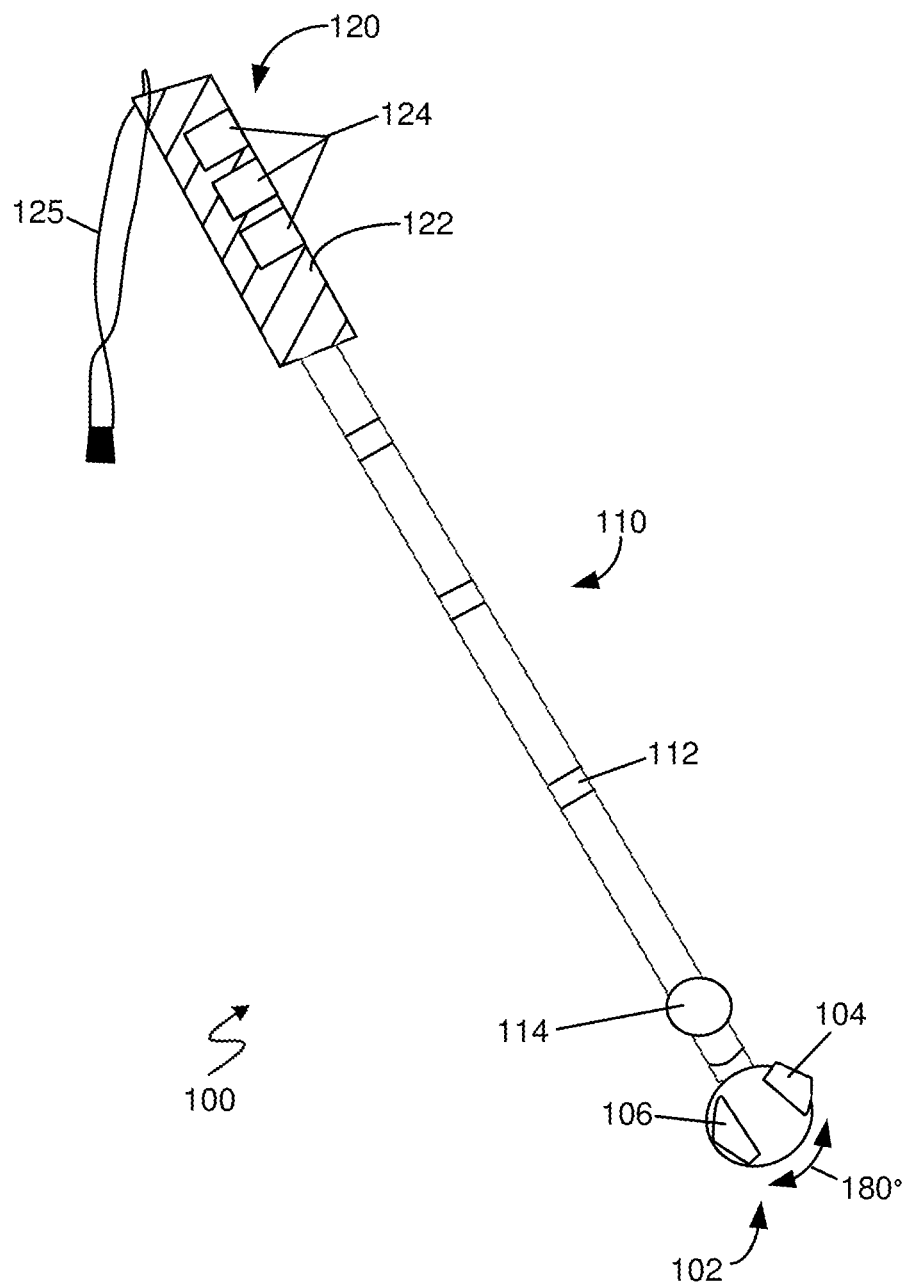
FIG. 1A illustrates an external view of a wide sweep cane according to at least one embodiment.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Through electronics, computer processing, sensor and electronic component integration with the cane, and use of haptic feedback the present embodiments achieve the capability of increasing the coverage area of the sweeps of a cane to provide more information to a user such as a blind person. With the increased coverage area, the cane user is able to obtain more information about the environment and therefore better able to make travel, e.g., walking, decisions. The present embodiments therefore help improve the experience of the user who is operating the cane and help achieve improved collection of insights and/or data from the environment. A user can use a traditional cane to gain information about an area within the extent of reach of the traditional cane. It has been known for a user to sweep the cane in a side-to-side pattern as the user walks along. The present embodiments include improved sensors and design compared to the traditional cane to expand the coverage area that is able to be sensed. The present embodiments also achieve advantages with regard to reduced expense, reliability, and sensing ability compared to other known solutions such as brooms, audible echo location, seeing-eye dogs, human guides, etc. for helping the visually impaired. At least some embodiments include, integrated into the wide sweep cane, TOF sensors, one or more haptic feedback generators, and one or more computers for controlling the sensors and haptic feedback generator(s) and interpreting the sensor data thereof.

White canes are recognized throughout the world as universal indicators of blindness of the respective user. Some countries institute additional color schemes for visually impaired individuals. In at least some embodiments, the presently described wide sweep cane is implemented as a white cane which at least in part due to the cane structure and white marking for the cane achieves a fall back functionality should the electronic enhancements abruptly cease to function. The present embodiments are able to be implemented in both long and short canes as well as straight and collapsible ones. A user who is familiar with using a traditional white cane will be able to quickly learn to use the wide sweep cane described herein in order to obtain enhanced obstacle sensing. Such user would not need extensive retraining to be able to use the wide sweep cane described herein.

Referring to FIG. 1A, an exemplary wide sweep cane 100 in accordance with one embodiment is depicted. The wide sweep cane 100 includes a central cane region 110 that is a pole and/or an extendible pole. The wide sweep cane 100 includes a handle 122 at one distal end, e.g., a second end 120, of the wide sweep cane 100. The wide sweep cane 100 includes a first end 102, e.g., a tip, at one distal end of the wide sweep cane 100. Various sensors are disposed at, near, and/or adjacent to the first end 102. Along the length of the wide sweep cane 100, the first end 102 and the second end 120 are disposed oppositely from each other.

In at least some embodiments, the first end 102 of the wide sweep cane 100 includes a protuberance as compared to the periphery of the central cane region 110. The protuberance provides a larger surface for tapping on the ground to provide extra information to the visually-impaired user who is sweeping with the cane. For the wide sweep cane 100, the protuberance also provides additional surface structure for holding the first and second TOF sensors 104, 106.

The first end 102 includes an arrangement of sensors including a first TOF sensor 104 and a second TOF sensor 106. The TOF sensors are time-of-flight (TOF) sensors which are based on using a time of flight of an emitted sensor signal to measure a distance between the sensor base and one or more objects in the environment of the sensor base. The time of flight refers to a time of the round trip for an emitted sensor signal such as an artificial light signal of a laser or a light-emitting-diode (LED). The TOF sensors may use transmission and reflection of light and/or sound such as ultrasonic transmission or other current or future equivalent emitted beams. Each TOF sensor includes a sensor housing and one or more transponders, transmitters, and/or receivers to transmit and receive the signals. The transponders, transmitters, and/or receivers are positioned in and/or on the sensor housing. In some embodiments, the transponders, transmitters, and/or receivers for each TOF sensor are positioned in and/or on the protuberance of the first end 102. In some embodiments each of the first and second TOF sensor housings is a unitary portion of the protuberance. In some embodiments, these two TOF sensors are arranged 180° apart from each other around a periphery of the first end 102. Particularly, a transponder of the first TOF sensor 104 is positioned 180° circumferentially around a periphery of the first end 102 apart from another transponder of the second TOF sensor 106. The first TOF sensor 104 is arranged on a left side of the first end 102 (from the perspective of a user who is holding the wide sweep cane 100 by grasping the handle 122) and the second TOF sensor 106 is arranged on a right side of the first end 102 (also from the perspective of the user who is holding the wide sweep cane 100 by grasping the handle 122). In at least some embodiments, the first and second TOF sensors 104, 106 are positioned to transmit a beam generally parallel to the ground by virtue of a respective transmission exit aperture of each of the first and second TOF sensors 104, 106 being oriented orthogonal to a central axis of the cane. Thus, the emitted beams will hit any obstacle (in the coverage area) that protrudes upward from the ground surface. The hit beam is thereby reflected back towards the sensors for capture in a receiver/transponder of the respective sensor. In at least some embodiments the TOF sensors are short-range side-firing TOF sensors.

In some embodiments, the cane embodiment includes a single TOF sensor disposed in and/or at the first end 102 of the cane in order to generate an increased area of coverage in a sweeping motion. The single TOF sensor is disposed laterally on one side of the first end 102 or centrally within the first end 102. The single TOF sensor also passes any reflected signals that it receives to the processor for data evaluation and haptic feedback generation upon sensing an object/obstacle in the coverage area.

Figure 2:
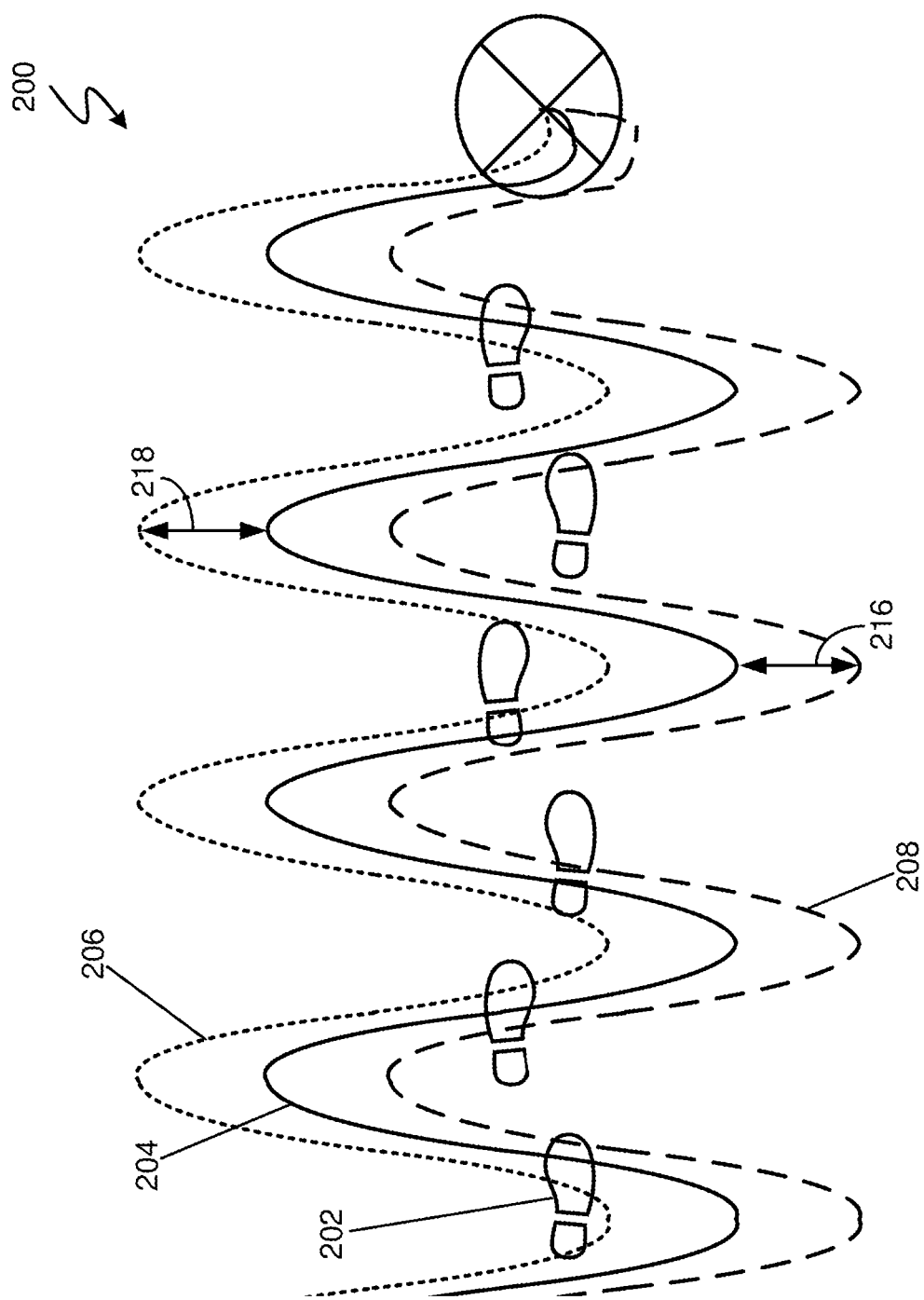
FIG. 2 illustrates the increased sensing coverage area of using the wide sweep cane described herein as compared to a sensing coverage for a traditional cane.

A cane is used in a traditional sweeping pattern by the user holding the cane in his or her hand on one end and moving the other end of the cane from side to side as the user walks along. FIG. 2 shows as an example a traditional cane sweeping path 204 as a user walks along a pathway indicated by shoeprints 202. The back-and-forth sweeping is indicated by the sinusoidal wave path. Along the traveling path, the cane extends forwards from the user and the feet and body of the user trail the cane. The distal point of the cane away from the user may rest on the ground ahead of the position of the feet of the user who is holding the cane. The sinusoidal nature of the traditional cane sweeping path 204 (as well as for the other sweeping paths to be described subsequently) is used for illustration purposes; the actual sweeping motion with the cane is not always in actual use perfectly rhythmic and consistent for the distances spanned back and forth by a particular user. The user may hold the cane so that the cane extends diagonally from the hands of the user down towards the ground. Such usage is preferred for open spaces. In tight spaces the cane may also be held upright instead of diagonally and twisted so that the TOF sensors face laterally.

The electronics of the wide sweep cane 100 are configured to sense a direction of movement of the user and the wide sweep cane 100 that is being used by the user. Based on the determined sense of direction, the wide sweep cane 100 controls one of the two TOF sensors 104, 106 to fire based on whichever of the two is currently on a leading side for the sweep of the wide sweep cane 100. Thus, as the wide sweep cane 100 swings/sweeps to the left (user's left), the first TOF sensor 104 (disposed on the lateral left side of the front end 102) is fired and the trailing sensor, the second TOF sensor 106 (disposed on the opposite lateral right side of the front end 102), is not fired. Thus, the signal of the first TOF sensor 104 is used to identify obstacles as the cane is swept in the direction of the first TOF sensor 104 (e.g., right-to-left pass of the wide sweep cane 100). Conversely, as the wide sweep cane 100 swings/sweeps to the right (user's right), the second TOF sensor 106 (disposed on the lateral right side of the front end 102) is fired and the trailing sensor, the first TOF sensor 104 (disposed on the opposite lateral left side of the front end 102), is not fired. Thus, the signal of the second TOF sensor 106 is used to identify obstacles as the cane is swept in the direction of the second TOF sensor 106 (during the left-to-right pass of the wide sweep cane 100). Various obstacles such as holes in the ground, knee-high obstacles, steps, obstructions, etc, are able to be sensed via the wide sweep cane 100 and its increased sweep sensing area.

By using the TOF sensors 104, 106, the area of coverage of sensing via the wide sweep cane 100 is increased as compared to the area of coverage sensed by the traditional white cane. FIG. 2 shows with the left enhanced coverage area 206 the coverage area achieved by the wide sweep cane 100 during a right-to-left sweep by the wide sweep cane 100. This left enhanced coverage area 206 achieves a greater area of coverage in the left direction compared to the traditional cane sweeping path 204. First coverage enhancement 218 in FIG. 2 depicts this distance of increase of the coverage area. In the opposite direction, FIG. 2 shows with the right enhanced coverage area 208 the coverage area achieved by the wide sweep cane 100 during a left-to-right sweep by the wide sweep cane 100. This right enhanced coverage area 208 achieves a greater area of coverage in the right direction compared to the traditional cane sweeping path 204. Second coverage enhancement 216 in FIG. 2 depicts this distance of increase of the coverage area. With the enhanced coverage areas, e.g., the left and right enhanced coverage areas 206, 208, achieved with the wide sweep cane as described herein, an advanced coverage area for sensing is achieved without a user having to exert excessive energy for high speed side-to-side sweeping of the cane.

In at least some embodiments, the TOF sensors 104, 106 include a beam exit aperture which may be adjusted to control an angle disbursement and an intended coverage projection of the emitted beam. A tight beam tends to travel farther than a wide beam. An amount of refracted signal that is received from an obstacle is higher if more of the beam hits the obstacle. In at least some embodiments, the respective beam exit aperture for each TOF sensor is pre-set and/or calibrated to provide short-range and wide-angle coverage for the TOF beams. In at least some embodiments, the respective beam exit aperture emits a beam with a beam angle of 36° or greater. In other embodiments the respective beam exit aperture is adjusted or manufactured to produce a narrower beam and emits a beam with a beam angle of 24° or greater.

In some embodiments, the TOF sensors 104, 106 transmit modulated light and receive reflections of the modulated light to sense any obstacle in the sweeping coverage area. In some embodiments, the TOF sensors include miniaturized three dimensional TOF cameras which emit light and receive reflections of the light. In some embodiments, the TOF sensors include a pixel array and the reflected light is matched to pixels of the pixel array so that enhanced positional information of any object in the coverage area is obtained. In some embodiments, each TOF sensor includes a controller which controls the modulation of the light as well as the demodulation of the reflected signals with appropriate modulation controlling signals. The emitted light is reflected by an obstacle in the field-of-view, and a lens system, e.g., a system which includes one or more optical filters, projects the received reflected and modulated light onto a demodulation imager, which includes an array of pixels. By applying appropriate synchronous sampling to each of the pixels of the demodulation imager, distance is derived based on the travel time of the emitted light from the sensor to the obstacle and back.

In some embodiments, the TOF sensors 104, 106 transmit ultrasonic signals and the time of flight of the reflected and received ultrasonic signals are used to identify an obstacle in the sweeping coverage area. The transmitted signal in some ultrasonic embodiments is a sound that travels in a conical shape. The ultrasonic transmission bounces off objects to create an echo that is captured by the sensor receiver. A distance is calculated by multiplying the elapsed time by the speed of sound divided by two.

In some embodiments, the TOF sensors 104, 106 include one or more of radio frequency-modulated light sources with phase detectors, range gated imagers, and/or direct time of flight imagers. The TOF sensors 104, 106 in some embodiments include one or more of an illuminator, an optics lens, an image sensor with pixels, driver electronics, and a computer to perform distance calculations.

Based on the signals received by the TOF sensors 104, 106, determinations are made by the wide sweep cane program 516 (see FIG. 5) whether an obstacle is present in the vicinity of the wide sweep cane 100 and its user. Upon sensing of an obstacle via either the first TOF sensor 104 and/or the second TOF sensor 106, the wide sweep cane program 516 generates a signal for the haptic feedback interface 124 to haptically notify the user holding the handle 122 and holding the haptic feedback interface 124. In at least some embodiments, the haptic feedback interface 124 is configured to provide a variety of different haptic feedback to a user. In some instances, the wide sweep cane program 516 generates a first haptic feedback upon sensing of an obstacle via the first TOF sensor 104, and generates a second haptic feedback, which is different from the first haptic feedback, upon sensing of the same or another obstacle via the second TOF sensor 106. In some embodiments, the first haptic feedback includes a long-pulse or steady haptic feedback pattern such as a steady buzzing. In some embodiments, the second haptic feedback includes a short-pulse haptic feedback pattern such as a pulsed buzzing. The long-pulse and short-pulse haptic feedback embodiments are examples of the two haptic feedbacks being different from each other to allow the user to better recognize from which side an obstacle is located. The long-pulse includes intermittent pulses with each pulse lasting for a longer duration than the duration for which each pulse of the intermittent short pulses lasts.

In a simplified version, the haptic feedback interface 124 includes a vibrator. In other embodiments, each separate surface section of the haptic feedback interface 124 includes a separate respective vibrator configured to send a separate vibration haptic pattern to the respective surface section. In some embodiments, the haptic feedback interface 124 includes one or more of a linear vibro-tactile element, a matrix shaped vibro-tactile element, an array of pins, and/or a Braille display. In at least some embodiments, haptic feedback patterns are based on variable height profiles of the portions of the interface, variable vibration, vibration intensity, electro tactile stimulation, different haptic rhythms, and/or interstimulus duration. In some embodiments, for obstacles sensed in particular areas of the spanned cane coverage area a corresponding haptic feedback signal is generated for a portion of the haptic interface that geographically/spatially matches the spanned cane coverage area. In other words, for an example an obstacle detected to the far left of the user a haptic feedback pattern is generated in a far left portion of the surface of the haptic feedback interface 124.

In at least some embodiments, the first and second TOF sensors 104, 106 include a built-in doppler ranging capability to determine a movement of direction of the wide sweep cane 100. The doppler ranging capability includes the generation of electromagnetic beams that are transmitted outwards from the front end 102 of the wide sweep cane 100, e.g., via a transponder downwards towards a ground surface. Some of the energy is backscattered to the housing of the TOF sensors 104, 106 and captured via the transponder and/or via another receiver. With knowledge of the beam angles, the wide sweep cane program 516 is able to analyze information of the backscattered energy to determine a movement of direction of the wide sweep cane 100. Based on the currently-determined sense of direction of the wide sweep cane 100, the wide sweep cane program 516 activates firing of the respective TOF sensor that leads and not trails for the respective leftward or rightward current sweeping movement of direction for the wide sweep cane 100.

In some embodiments, alternatively or additionally to the doppler features the wide sweep cane 100 includes a gyroscope 114 to help determine a direction of movement of the wide sweep cane 100 and thereby to help control the firing of the relevant leading first or second TOF sensor 104, 106 of the wide sweep cane 100. The gyroscope 114 is positioned on a lower portion of the wide sweep cane 100, e.g., in a lowest section of the central cane region 110 before the first end 102 of the wide sweep cane. With the gyroscope 114 positioned there, the gyroscope 114 is near, e.g., adjacent and above or immediately above, the first and second TOF sensors 104, 106. The gyroscope 114 is connected to the computer that hosts the wide sweep cane program 516. The gyroscope 114 produces directional movement signal data for analysis via the wide sweep cane program 516. Based on the movement of direction signal produced by the gyroscope, the wide sweep cane program 516 recognizes whether the first TOF sensor 104 is leading (e.g., during a leftward movement of the sweep) or whether the second TOF sensor 106 is leading (e.g., during a rightward movement of the sweep). This movement of direction signal from the gyroscope 114 is then used by the wide sweep cane program 516 to control firing of the first and second TOF sensors 104, 106—with the first TOF sensor 104 (on the left side of the wide sweep cane 100) being fired during the leftward sweep and the second TOF sensor 106 (on the right side of the wide sweep cane 100) being fired during the rightward sweep.

In at least some embodiments, the gyroscope 114 is a vibrating structure gyroscope such as a Coriolis vibratory gyroscope (CVG). The vibrating structure gyroscope uses a vibrating structure to determine a rate of rotation based on the underlying physical principle that a vibrating object tends to continue vibrating in the same plane even if support of the vibrating object rotates. The Coriolis effect causes the object to exert a force on the support, and by measuring this force the rate of rotation can be determined. In at least some embodiments, such a vibrating structure gyroscope is manufactured with microelectromechanical (MEMS) technology. In some embodiments the vibrating structure gyroscope includes one or more of a cylindrical resonator gyroscope, a piezoelectric gyroscope, a tuning fork gyroscope, a hemispherical resonator gyroscope, and a vibrating wheel gyroscope. The gyroscope 114 produces and provides digital or analogue outputs and in at least some embodiments is packaged like an integrated circuit. In some instances, the package provided includes multiple gyroscopes and/or multiple-axis gyroscopes to provide multiple degrees of freedom, e.g., six degrees of freedom. In some embodiments, microlithography is used to construct one or more types of the above-mentioned vibrating structure gyroscopes.

Figure 1B:
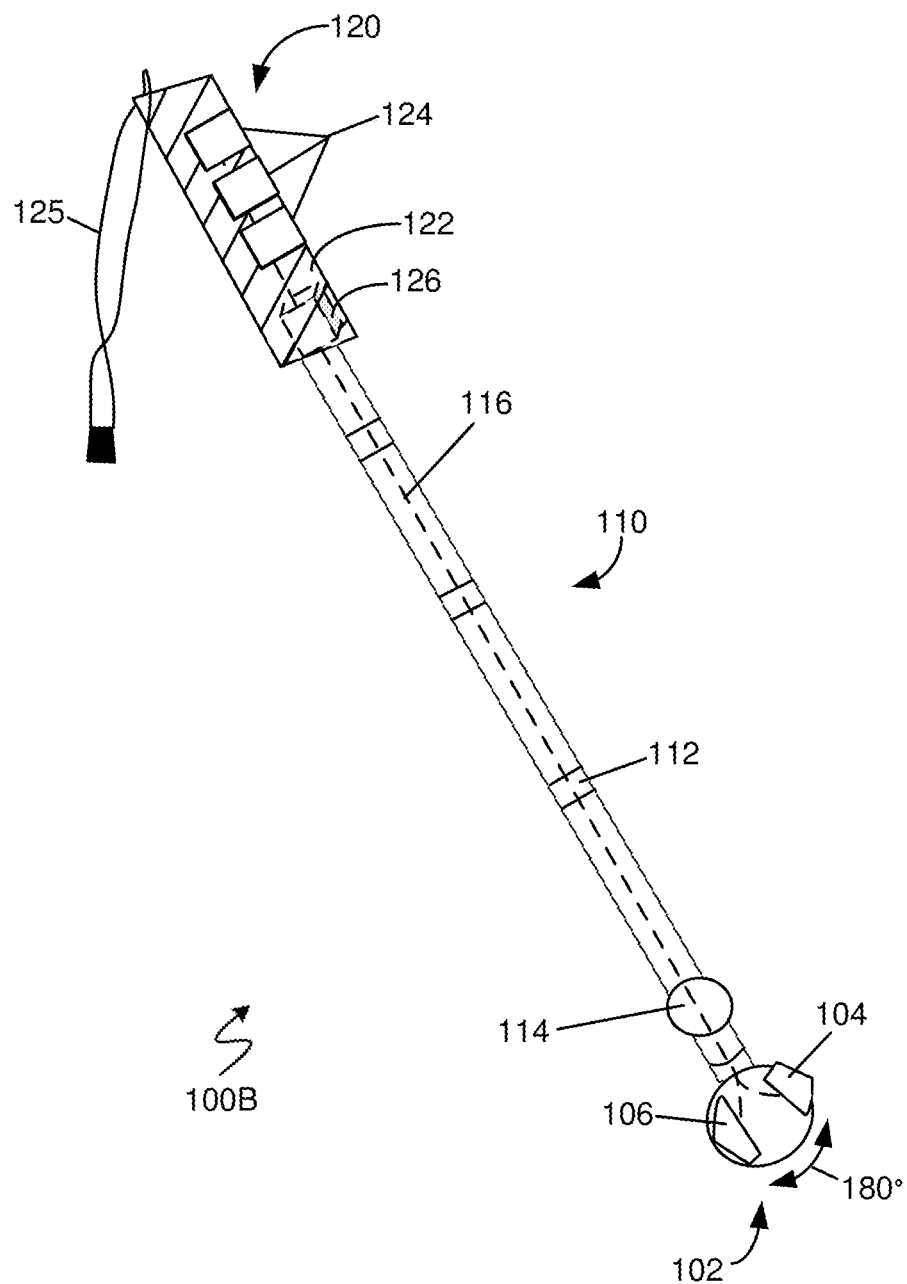
FIG. 1B illustrates a view of a wide sweep cane and also illustrates inner components thereof according to at least one embodiment.
Figure 1C:
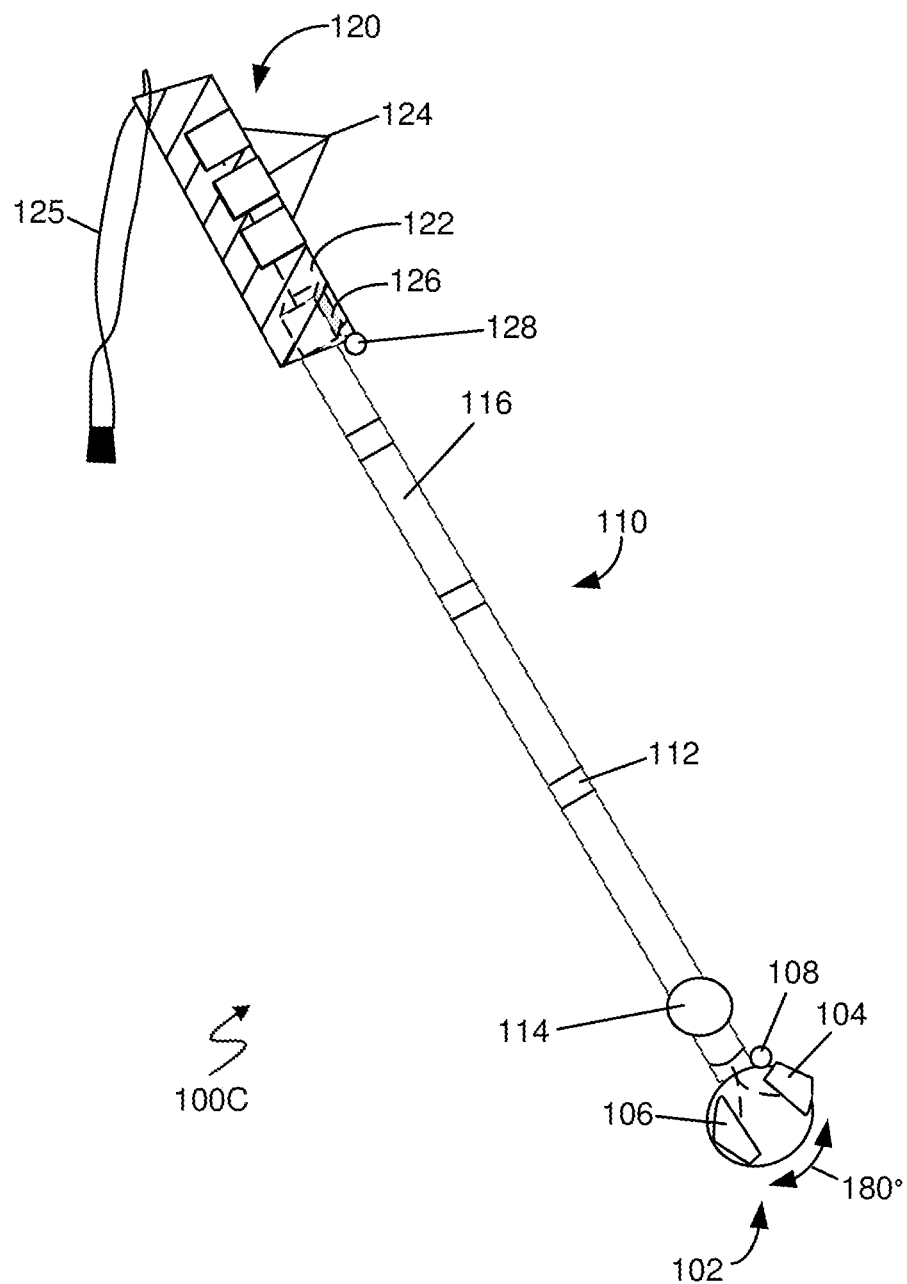
FIG. 1C illustrates a view of a wide sweep cane and also illustrates additional transmission components according to another embodiment.

In the embodiments shown in FIGS. 1A-1C, the central cane region 110 is an extendible pole which can extend or retract via multiple extension points 112. FIG. 1A shows three extension points 112 along the central cane region. The extension points 112 allow the length extension of the cane to be adjusted, e.g., based on a height of a user. For example, a tall user would prefer a longer cane because the hand of the tall user would be higher off the ground. A short user would prefer a shorter cane because the hand of the short user would be closer to the ground. In some embodiments, each extension point 112 includes a twist enclosure. Twisting an outer segment loosens or unloosens the central cane region 110. In a loosened state, the following cane segment region may be pulled out and extended. Once the cane segment is pulled out to a desired length, then the extension point 112 may again be twisted to a tightened position so that the extension length for that following cane segment is maintained. Other extension mechanisms besides the twist closure may be implemented in other embodiments. By loosening all of the extension points 112 and reducing all of the central cane segments, the wide sweeping cane 100 may also be reduced to a minimal length during non-use, e.g., for more convenient storage purposes, e.g., in a clothing pocket or bag of the user.

In some embodiments, all sections of the wide sweep cane run along a central longitudinal axis of the wide sweep cane 100. In some embodiments, the central cane region 110 has a longitudinal central axis which matches the longitudinal central axis of the entire wide sweep cane 100. In other embodiments, the central cane region 110 has portions such as ornamental curves that are not entirely colinear with the cane central longitudinal axis, but the central cane region 110 nevertheless extends to physically connect the handle 122 to the first end 102 which may include a protuberance with TOF sensors.

The wide sweep cane 100 includes a handle 122 at the second end 120. In the depicted embodiment, the handle 122 is connected to a furthest portion of the central cane region 110. In at least some embodiments, the handle 122 is composed of a material that is different than the material of the central cane region 110. In at least some embodiments, the handle 122 is composed of a cushioned material to facilitate user comfort while the user uses their hand to grasp and/or grip the handle 122 and hold the wide sweeping cane 100 and perform wide sweeping with the wide sweeping cane 100. In some embodiments the cushioned material is positioned around the outside of a pole portion which connects to a furthest portion of the central cane region 110. In some embodiments, the further portion of the central cane region 110 extends as a continuous piece with the pole portion directly under the handle 122. The handle 122 may be formed via molding the cushion material directly on the end portion of this continuous pole.

A haptic feedback interface 124 is built into the handle 122 so that the electronic sensor system of the wide sweep cane 100 is able to provide haptic feedback to a user holding the handle 122. At one or more of the multiple surfaces of the haptic feedback interface 124, haptic sensations are generated so that the hand of the user holding the handle 122 and the haptic feedback interface 124 is able to feel and receive those haptic sensations, e.g., to be notified of an obstacle sensed by the sensors disposed at the opposite end of the wide sweep cane 100. A haptic feedback computer 126 (see FIGS. 1B-1C) may be positioned internally within the wide sweep cane 100 in the second end 120 and generate the signals to produce haptic sensations that are provided at the haptic feedback interfaces 124. The haptic feedback computer 126 may receive signals from the sensors in the first end 102 of the wide sweep cane 100B. FIG. 1A shows an embodiment with the haptic feedback interface 124 divided into multiple divided segments so as to give more detailed or nuanced haptic sensations. In some embodiments, each of the separated haptic sections are constructed to provide a unique haptic sensation to a different segment or finger of the hand of the user who is holding the wide sweep cane 100 at the handle 122. In other embodiments, each of the separated haptic sections is constructed to generate the same haptic feedback pattern as the other segments. Although three separate haptic sections are depicted in FIG. 1A, more or fewer haptic sections may be part of the haptic feedback interface(s) 124 that together with the haptic feedback computer 126 form the haptic feedback generator. In other embodiments, an alternative haptic feedback interface includes a single unitary interface surface.

In some embodiments, a band 125 is attached to the handle 122 and facilitates extra securement for the wide sweep cane 100. A user may place the band 125 around his or her wrist while the user holds the wide sweep cane 100 at the handle 122. The band 125 may help prevent the wide sweep cane 100 from falling far away from the user if the user loses his or her grasp on the handle 122.

In some additional embodiments, the wide sweep cane 100 is paired with other IoT devices to provide alternate feedback such as audio prompts that provide additional detail on what a pending obstacle is. Such wide sweep cane 100 in some embodiments includes an audio speaker, e.g., built into the handle 122, of the wide sweep cane 100. For example, other devices could sense that a puddle lies ahead of the user of the wide sweep cane 100, the other devices send a signal to the wide sweep cane 100, and in response the wide sweep cane 100 generates an audio message that is played by the audio speaker of the wide sweep cane 100 that warns the user specifically about the upcoming puddle.

In some additional embodiments, the wide sweep cane 100 also includes virtual extensions such as one or more lasers, radio frequencies, cameras, microphones, electronic noses, etc. which scan the area to provide additional data on the surrounding areas. Data gathered is transmitted to the wide sweep cane program 516 to enhance the feedback generated which can thereby enhance the experience of the user by enabling the user to have a more detailed understanding of what is around them. For example, if an electronic nose senses a bad smell in the near vicinity of the wide sweep cane 100 a message is generated and presented for the user to recommend not stepping in the spot where the smell is detected. If a camera recognizes gum on the ground in the vicinity of the user of the wide sweep cane 100, a message is generated and presented for the user (e.g., audibly via the audio speaker) to recommend not to step in the gum. The wide sweep cane 100 makes these presentations as verbal messages played over an audio speaker of the wide sweep cane 100 in some embodiments.

FIG. 1B illustrates a view of a wide sweep cane 100B. In FIG. 1B, inner components of the wide sweep cane 100B according to an embodiment are shown. The wide sweep cane 100B shown in FIG. 1B includes many similar components as the wide sweep cane 100 shown in FIG. 1A and, therefore, many common reference numerals are used between FIGS. 1A and 1B.

Figure 5:
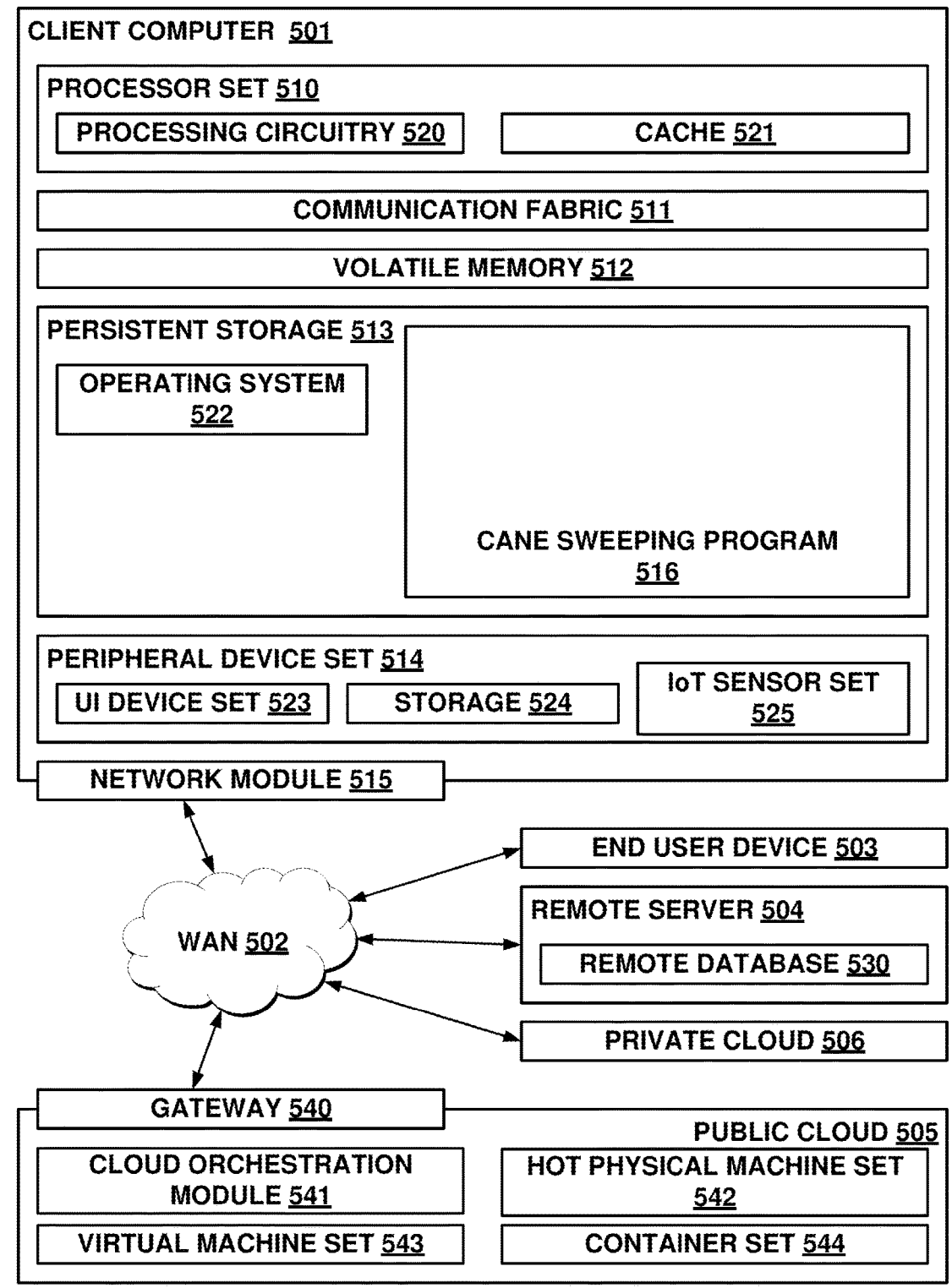
FIG. 5 is a block diagram illustrating a computer which may be part of a wide sweep cane described in the other drawings.

FIG. 1B shows a wide sweep cane computer 126 disposed within the interior of the handle 122. Details about the wide sweep cane computer 126 are depicted in FIG. 5 (via analogy to the computer 501). The wide sweep cane computer 126 hosts a wide sweep cane program 516 to facilitate analysis of received sensor signals and generation of appropriate haptic feedback based on the received sensor signals. The wide sweep cane computer 126 is configured to receive and analyze signals from the various sensors of the wide sweep cane 100B such as from the first and second TOF sensors 104, 106 and in some embodiments from the gyroscope 114 and/or doppler sensor. The wide sweep cane computer 126 is also configured to generate a haptic feedback transmission signal for the haptic feedback interfaces 124. Therefore, in response to the analysis of the received sensor signals indicating the presence of an obstacle in the sensed coverage area of the wide sweep cane 100B, the wide sweep cane computer 126 generates and transmits a haptic feedback transmission signal for the haptic feedback interfaces 124. Upon receipt of the haptic feedback transmission signal, the haptic feedback interfaces 124 produce a haptic feedback sensation based on the transmission signal. A visually-impaired user gripping the wide sweep cane 100B at the handle 122 is thereby able to learn information about obstacles and/or potential obstacles in the vicinity. Based on experience and/or training the user is able to interpret which of different haptic feedback types are provided by the haptic feedback interfaces 124 so that the user can better recognize on which side of the wide sweep cane 100B the obstacle is located.

FIG. 1B also shows that the various sensors communicate with the wide sweep cane computer 126 via a physical wire 116 that extends through the interior of the wide sweep cane 100B and runs from the first end 102, through the central cane region 110, and to the second end 120. Additional physical wiring runs within the handle 122 to physically connect the wide sweep cane computer 126 to the haptic feedback interfaces 124. In some embodiments, this physical wire 116 is formed from metal for transmitting a charge as a communication/sensor signal.

FIG. 1C illustrates a view of a wide sweep cane 100C. The wide sweep cane 100C shown in FIG. 1C includes many similar components as the wide sweep cane 100 shown in FIG. 1A and the wide sweep cane 100B shown in FIG. 1B and, therefore, many common reference numerals are used between FIGS. 1A, 1B, and 1C.

In FIG. 1C, some inner components of the wide sweep cane 100C such as the wide sweep cane computer 126 are shown. In addition, the wide sweep cane 100C includes components as described below which enable a wireless transmission between the sensors at the first end 102 of the wide sweep cane 100C and the wide sweep cane computer 126 at the second end 120 of the wide sweep cane 100C. At the first end 102 of the wide sweep cane 100C, a transponder 108 that is connected to the first TOF sensor 104, the second TOF sensor 106, and the gyroscope 114 is configured to transmit sensor data signals to another transponder 128 disposed at the second end 120 of the wide sweep cane 100C. The other transponder 128 is at, near, and/or on the handle 122 and is physically connected to the wide sweep cane computer 126 in order to pass on the received sensor signals to the wide sweep cane computer 126 for its analysis thereof. In some embodiments the transponders communicate on a basis of optical signal transmission. In other embodiments, the transponders communicate on a basis of radio signal transmission. Other similar wireless transmissions are also contemplated for communication of the sensor signals from the first end 102 to the second end 120.

Thus, the present embodiments encompass wireless and/or wired transmission of sensor signals to the wide sweep cane computer 126 for processing there.

Power sources for operating the first and second TOF sensors 104, 106, the haptic feedback interface 124, and the wide sweep computer 126 are in some embodiments disposed within the handle 122. In some embodiments, a power source for the TOF sensors 104, 106 are disposed within the first end 102 of the wide sweep cane 100, 100B, 100C. In some embodiments, power sources are disposed in both the first end 102 and the second end 120 of the wide sweep cane for powering sensors and/or electronic components in the vicinity. In some embodiments, a voltage supply of 3V to 6V with a current around 125 mA is sufficient for operating the haptic feedback interface 124. The haptic feedback generator in some embodiments includes a vibration motor whose speed is controlled using a pulse width modulation signal which controls the length and intensity of a generated haptic vibration pulse.

It should be appreciated that FIGS. 1A-1C provide only illustrations of some implementations and do not imply any limitations with regard to the environments and configurations in which different embodiments may be implemented. Many modifications to the depicted environments and configurations may be made based on design and implementation requirements.

Figure 3:
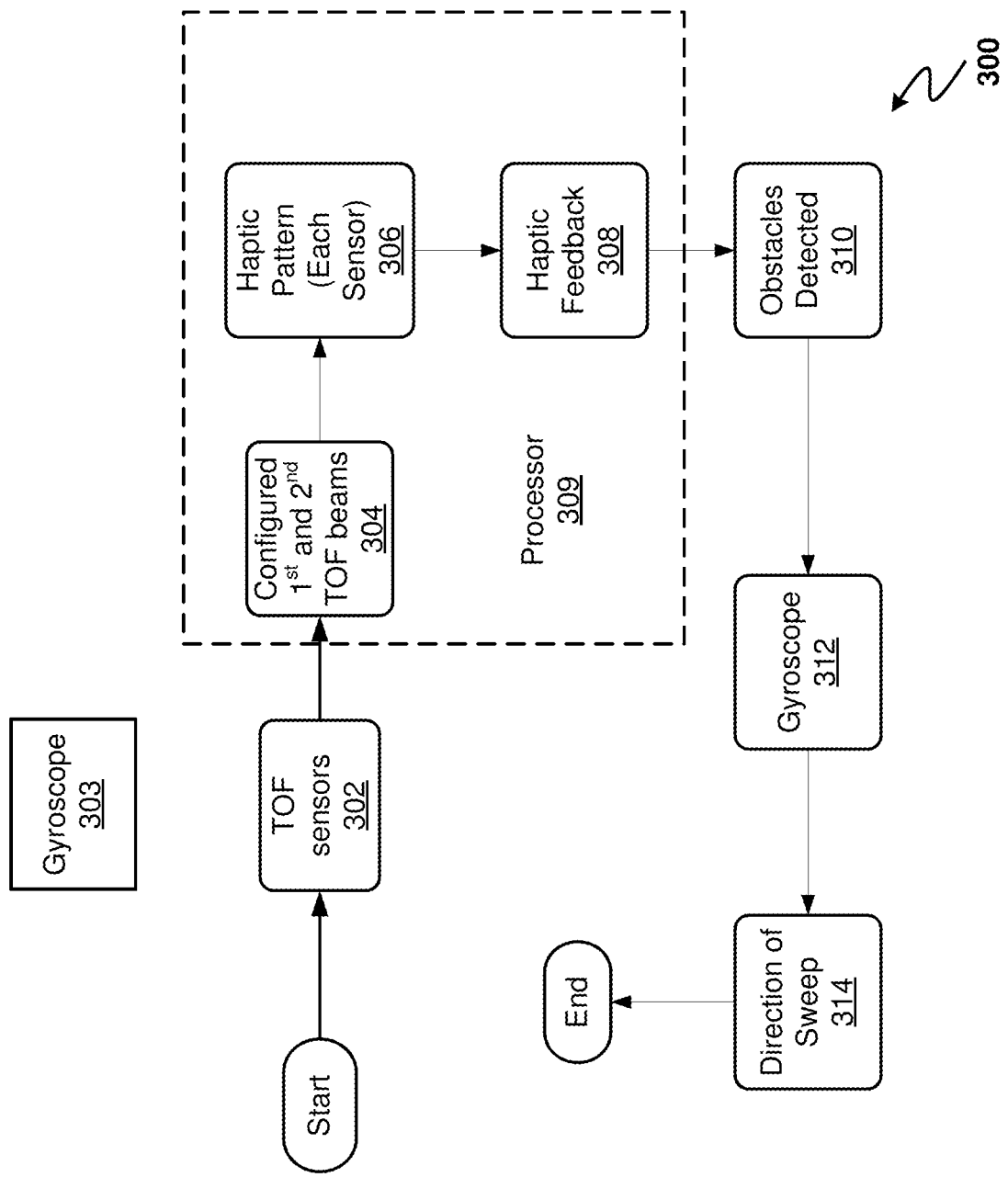
FIG. 3 illustrates a pipeline of wide sweep cane information processing and signal generation according to at least one embodiment.

FIG. 3 illustrates a pipeline 300 of wide sweep cane information processing and signal generation according to at least one embodiment. The various wide sweep canes 100, 100B, 100C described previously and shown in FIGS. 1A-1C, respectively, are usable in the pipeline 300. TOF sensors 302 such as the first and second TOF sensors 104, 106 transmit TOF beams. In some instances, the gyroscope 303 such as the gyroscope 114 shown in FIGS. 1A-1C provides movement information that is used by the processor 309 to control the operation of the TOF sensors 302. Configured first and second TOF beams 304 are reflected, captured, and analyzed to recognize one or more obstacles within a scanning area of the TOF beams. The processor 309 which may be equivalent to the wide sweep cane computer 126 performs the analysis of the reflected received TOF beams. Based on the analysis and obstacle sensed, the processor 309 generates a haptic pattern 306 based on the particular sensor that captured the reflected TOF beam. The processor 309 generates a signal that causes a haptic area such as the haptic feedback interface 124 to provide haptic feedback 308. Via the haptic feedback 308, the user holding the haptic area haptically receives a warning about one or more obstacles detected 310 in the path of the user and the wide sweep cane. For example, the haptic feedback 308 includes steady buzzing or pulsed buzzing depending on the particular TOF sensor which detected the obstacle. The gyroscope 312 such as the gyroscope 114 shown in FIGS. 1A-1C provides information about movement of the wide sweep cane. Based on the gyroscope information, the processor 309 is able to determine a direction of sweep 314 of the wide sweep cane.

Figure 4:
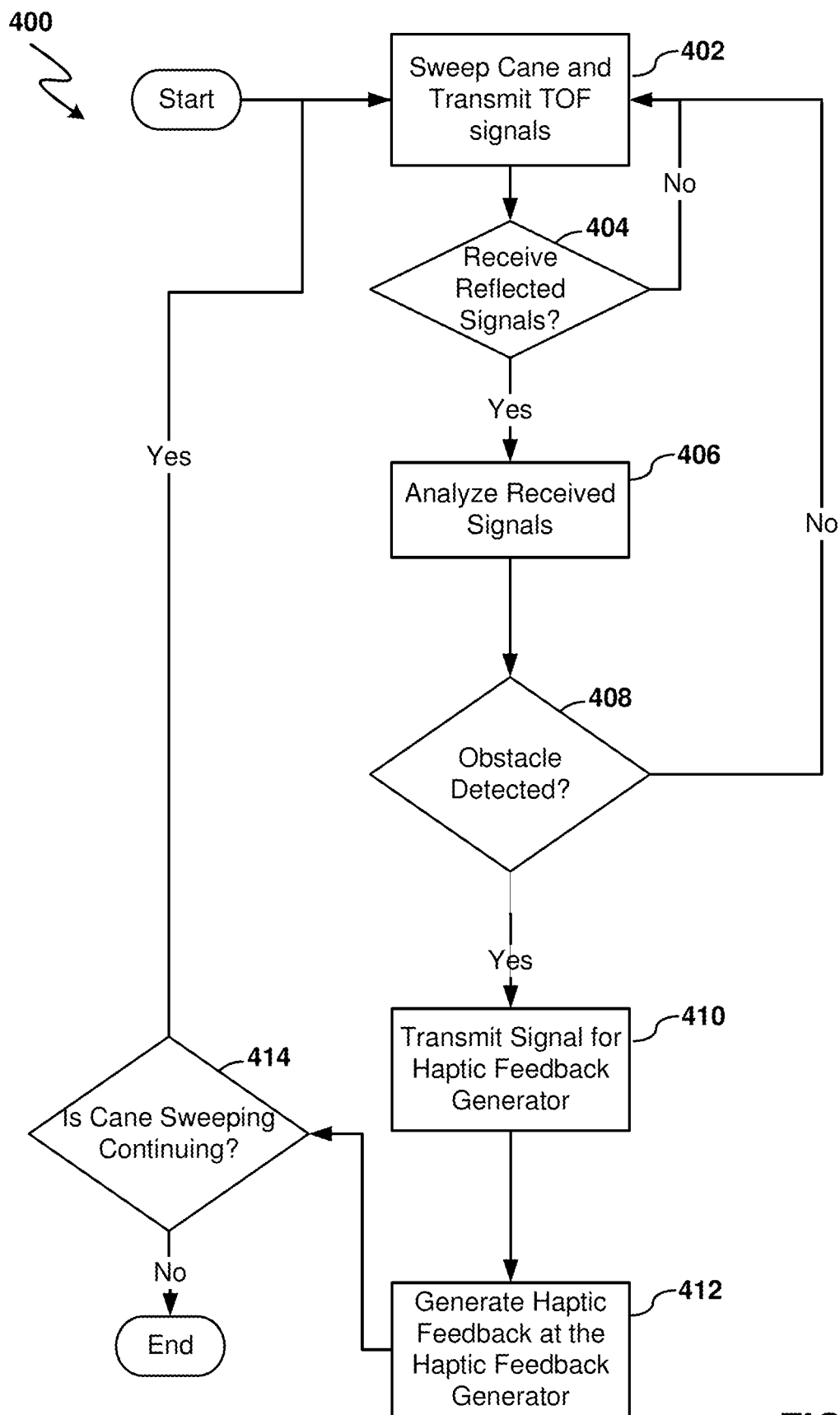
FIG. 4 is an operational flowchart illustrating a wide sweep cane obstacle warning process according to at least one embodiment which may, for example, be carried out with the various wide sweep canes depicted in one or more of FIGS. 1A-1C.

Referring now to FIG. 4, an operational flowchart depicts a wide cane sweeping process 400 that may, according to various embodiments, be performed by the various wide sweep canes depicted in FIGS. 1A-1C.

In a step 402 of the wide cane sweeping process 400, a wide sweep cane is swept and TOF signals are transmitted. FIG. 2 described above shows an example of an enlarged coverage area that occurs for a sweeping path of a wide sweep cane as described herein. FIGS. 1A-1C show examples of wide sweep canes 100, 100B, 100C which are implemented according to present embodiments and which may be used for step 402. The first and second TOF sensors 104, 106 on the wide sweep canes 100, 100B, 100C transmit TOF signals to the environment of the wide sweep canes 100, 100B, 100C.

In a step 404 of the wide cane sweeping process 400, a determination is made whether reflected signals are received. If present, these reflected signals would be from the TOF signals that were transmitted in step 402. In response to an affirmative determination in step 404 due to the receiving of reflected signals, the wide cane sweeping process 400 proceeds to step 406. In response to a negative determination in step 404 due to no receiving of reflected signals, the wide cane sweeping process 400 proceeds back to step 402. Thus, steps 402 and 404 constitute a small loop which is not exited until the cane is no longer in use or reflected signals are received. The first and second TOF sensors 104, 106 on the wide sweep canes 100, 100B, 100C include a transponder and/or a receiver which are configured to receive any reflected TOF signals after the TOF signals are previously transmitted to the immediate environment of the wide sweep canes 100, 100B, 100C. The electronics of the wide sweep canes 100, 100B, 100C are configured to recognize whether a reflected signal is received via the transponder and/or receiver.

In a step 406 of the wide cane sweeping process 400, the received signals are analyzed. The received signals refers to those signals received in step 404 from the TOF signals transmitted in step 402. For the embodiments shown in FIGS. 1A, 1B, and 1C, the wide sweep cane computer 126 is configured to analyze receive signals. The first and second TOF sensors 104, 106 at the first end 102 of the wide sweep canes 100B, 100C are configured to further transmit the received signals and/or new signals representative of the received signals to the wide sweep cane computer 126, e.g., disposed at the second end 120 of the wide sweep canes 100, 100B, 100C so that the wide sweep cane computer 126 can receive and analyze same.

In a step 408 of the wide cane sweeping process 400, a determination is made as to whether an obstacle is detected. The detection or non-detection occurs based on the analysis of the received signals that occurred in step 406. In response to an affirmative determination in step 408 due to the detection of an obstacle, the wide cane sweeping process 400 proceeds to step 410. In response to a negative determination in step 408 due to no detection of an obstacle, the wide cane sweeping process 400 proceeds back to step 402. Thus, steps 402, 404, 406, and 408 constitute another loop which is not exited until the cane is no longer in user or an obstacle is detected via the TOF signals. The wide sweep cane computer 126 includes the wide sweep cane program 516 with one or more signal analysis algorithms to perform the signal analysis and determination of obstacle sensing.

In a step 410 of the wide cane sweeping process 400, a signal is transmitted for the haptic feedback generator. For the embodiments shown in FIGS. 1A, 1B, and 1C, the wide sweep cane computer 126 is disposed within the handle 122 and has a relatively short distance for transmitting the haptic feedback signal to the haptic feedback interface 124. In some embodiments the signal transmission of step 410 occurs via a physical wiring between the wide sweep cane computer 126 and the haptic feedback interface 124. In other embodiments the signal transmission of step 410 occurs via a wireless, e.g., an optical, transmission between the wide sweep cane computer 126 and the haptic feedback interface 124. In other embodiments, the wide sweep cane computer 126 is disposed in or at a different region of the wide sweep cane and uses a wireless or wired transmission of the haptic signal to the haptic feedback interface 124.

In a step 412 of the wide cane sweeping process 400, haptic feedback is generated at the haptic feedback generator. This haptic feedback is based on the signal transmitted in step 410 which was generated in response to the detection of an obstacle in step 408 via the TOF signals. FIGS. 1A-1C showed the example of the haptic feedback interface 124 generating one or more haptic feedback patterns which can be haptically received/felt via a user who is holding the handle 122 and who is touching the haptic feedback interface 124. In at least some embodiments the haptic feedback provided depends on which of the multiple TOF sensors sensed the obstacle with their respective TOF signal. In some embodiments, a first haptic feedback pattern is generated in response to a first TOF sensor 104 sensing an obstacle and a second haptic feedback pattern different from the first haptic feedback pattern is generated in response to a second TOF sensor 104 sensing an obstacle. For example, the first haptic feedback pattern is a set of short haptic sensations, e.g., short buzzes, and the second haptic feedback pattern is a set of longer haptic sensations, e.g., longer buzzes. For embodiments with one or more additional TOF sensors, a respective additional different haptic feedback pattern is generated.

In a step 414 of the wide cane sweeping process 400, a determination is made as to whether the cane continues to sweep. In response to an affirmative determination in step 414 because the cane continues to sweep, the wide cane sweeping process 400 proceeds to step 402 for a repeat of the process 400. In response to a negative determination in step 414 due to no detection of continued sweeping of the cane, the wide cane sweeping process 400 proceeds to an end. In some instances, a minimum time threshold must be exceeded before the determination of no continued cane sweeping is considered to be affirmative. Thus, false positives (that occur during a temporary instance of the user standing still) can be avoided. Another iteration of the wide cane sweeping process 400 could subsequently be begun and performed after a first iteration is completed. In some embodiments, a data sensor signal from the gyroscope 114 and/or the doppler sensor is analyzed to determine whether the wide sweep cane 100, 100B, 100C continues to sweep. Thus, the wide sweep cane computer 126 in some embodiments performs a signal analysis to perform step 414 and to determine whether the cane continues to be in use, e.g., via being carried or used in a sweeping motion.

In a further embodiment, a cane with some or all of the above-described features transmits an obstacle detection signal to one or more other wearable electronic devices. These other electronic devices in turn perform global positioning (e.g., GPS) tagging and correlation with a mapping function for the position of the detected obstacle. The tagging may be generated and stored in a map database. A new path and predicted path of a user who is using the wide sweep cane is compared to the map database. In some embodiments, in advance of an expected encounter with one or more obstacles an audio speaker on the wearable device and/or on the wide sweep cane plays feedback and an advance warning based on the historical findings about the obstacle.

In another further embodiment, an additional TOF sensor is disposed higher on a position of the wide sweep cane, e.g., in the central cane region 110 on a segment closer to the handle 122. This additional TOF sensor transmits TOF signals to cover an area above the wide sweep cane. This additional TOF sensor helps detect low-clearance hanging obstacles such as tree branches or transoms. The signals from the additional TOF sensor are also input to the wide sweep computer 126 and are used to generate a haptic feedback signal, e.g., according to a new and unique haptic feedback pattern, for haptic transmission at the haptic feedback interface 124.

In another further embodiment, the sensing coverage via the first and second TOF sensors 104, 106 is customized based on the preferences and/or tolerances of a particular user. For example, one user is not bothered if the ground is uneven by ten percent or less and the haptic feedback system is adjusted to not give any haptic feedback signal for a detection of ground unevenness of ten percent of less. Another user has a lower threshold tolerance and wants an indication of any uneven surfaces. Therefore the adjustable haptic feedback generation system is adjusted to generate the haptic signal in response to the detection of any uneven ground. In some embodiments, the wide sweep computer 126 communicates wirelessly with one or more other computers which have user input devices. The wide sweep cane program 516 generates at a user interface, e.g., an audible and/or a tactile user interface, a mode via which a user can interact to input sensitivity adjustments for the haptic feedback system. These adjustments are transmitted to the wide sweep computer 126 for implementation in a particular wide sweep cane associated with a particular user.

As a further feature, obstacle data collected via the wide sweep cane is aggregated and shared with companies/governments who need insight on pathway experiences. For example, a city maintenance program is provided data points of what sidewalks need to be fixed and/or cleaned.

In one or more further embodiments, a haptic feedback generation signal is transmitted from the wide sweep computer 126 to another wearable device which itself provides additional haptic feedback to the user or to another individual assisting the user. For example, an additional wearable device is worn by a seeing eye dog who is trained to recognize the haptic feedback and look for an obstacle. In another example, the additional device is a computer, e.g., a phone, carried by the visually-impaired user in another hand. In another example, the additional device is a computer such as a watch worn on a wrist of the user or a phone stored in a pocket of the user in a manner so that vibrations of the phone are sensible by the user.

In some instances, the wide sweep cane described herein is manufactured by retrofitting an existing cane with the TOF sensors, haptic feedback generator, and electronic components for sensing objects and generating the haptic feedback. For such instances, a kit with the TOF sensors, haptic feedback generator, and electronic components may be provided for retrofitting on existing canes. Fasteners may be provided with the kit for fastening these elements of the kit to an existing cane.

According to an exemplary embodiment, a method for cane sweeping includes receiving signal data from a first sensor connected to a cane. The received signal data is analyzed via a processor of the cane to determine a direction of movement of the cane. Based on the determined direction of movement of the cane, one of multiple time-of-flight (TOF) sensors disposed with the cane is automatically selected by the processor. The selected TOF sensor is fired by generating and emitting a TOF beam. Received TOF signal data from the one of the TOF sensors, e.g., generated by receiving a reflection of the emitted TOF beam, is used by the processor to detect an obstacle within a path of the cane. Upon sensing of the obstacle, the processor may automatically generate a warning to the user to warn them about the sensed obstacle. The warning in some embodiments is presented as haptic feedback that is presented at a haptic feedback interface of the cane. The warning in some embodiments is presented as an audio warning played via an audio speaker of the cane or of a computer, e.g., phone, held by a user of the cane.

It may be appreciated that FIGS. 2-4 provide only illustrations of some embodiments and do not imply any limitations with regard to how different embodiments may be implemented. Many modifications to the depicted embodiment(s), e.g., to a depicted sequence of steps, may be made based on design and implementation requirements. Features of the various embodiments described may be combined with other embodiments or may replace features of other embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 shown in FIG. 5 contains an example of an environment for the execution of at least some of the computer code involved in performing the inventive methods, such as wide sweep cane program 516. In addition to wide sweep cane program 516, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and cane wide sweeping program 516, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated. Computer 501 may be the wide sweep cane computer 126 or may communicate wirelessly with the wide sweep cane computer 126.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in wide sweep cane program 516 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in wide sweep cane program 516 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, haptic devices, and virtual reality devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing exceptionally large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515. The network module 515 includes the software, hardware, and firmware necessary for communication with 5G NR signals.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers. For the micro-cell implemented in the present embodiments, a 5G NR network communication in a micro-cell or micro-MEC is used for the functions of the wide sweep cane program 516.

END USER DEVICE (EUD) 503 is any computer system that is used and controlled by an end user (for example, a customer of an enterprise that operates computer 501) and may take any of the forms discussed above in connection with computer 501. EUD 503 typically receives helpful and useful data from the operations of computer 501. For example, in a hypothetical case where computer 501 is designed to provide a natural language processing result to an end user, this result would typically be communicated from network module 515 of computer 501 through WAN 502 to EUD 503. In this way, EUD 503 can display, or otherwise present, the result to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods, and computer program products according to various embodiments. In this regard, each block in the flowchart, pipeline, and/or block diagrams may represent a module, segment, or portion of instructions, which comprises one or more executable instructions for implementing the specified logical function(s).

What is claimed is:

1. A cane for increased sweep coverage, the cane comprising:
    a first time-of-flight (TOF) sensor disposed at a first end of the cane and configured to emit a first TOF beam;
    a second TOF sensor disposed at the first end of the cane and configured to emit a second TOF beam;
    a haptic feedback generator disposed towards a second end of the cane that is distally opposite from the first end of the cane; and
    a processor configured to:
        receive signal data from the first TOF sensor and additional signal data from the second TOF sensor;
        determine, based on the received signal data and based on the received additional signal data, whether an obstacle is present within the first TOF beam and whether an obstacle is present within the second TOF beam;
        activate the haptic feedback generator in a first haptic feedback pattern in response to the processor determining that the obstacle is present; and
        activate the haptic feedback generator in a second haptic feedback pattern in response to the processor determining that the obstacle is present within the second TOF beam.

2. The cane of claim 1, wherein the first TOF sensor is disposed at a first position on the first end and the second TOF sensor is disposed at a second position on the first end, the second position being opposite from the first position.

3. The cane of claim 2, wherein the first position is laterally opposite from the second position.

4. The cane of claim 2, wherein the first position is circumferentially opposite from the second position.

5. The cane of claim 1, wherein the processor is configured to activate the haptic feedback generator in a second haptic feedback pattern different from the first haptic feedback pattern in response to the signals indicating that the obstacle is present within the second TOF beam.

6. The cane of claim 1, further comprising a Doppler sensor;
    wherein the processor is further configured to:
        receive signal data from the Doppler sensor;
        determine, based on the received signal data from the Doppler sensor, a direction of movement of the cane; and
        control firing of the first and second TOF sensors based on the determined direction of movement of the cane.

7. The cane of claim 1, further comprising a gyroscope;
    wherein the processor is further configured to:
        receive signal data from the gyroscope;
        determine, based on the received signal data from the gyroscope, a direction of movement of the cane; and
        control firing of the first and second TOF sensors based on the determined direction of movement of the cane.

8. The cane of claim 1, wherein the haptic feedback generator is disposed adjacent the second end.

9. The cane of claim 1, wherein the first haptic feedback pattern comprises a steady buzzing.

10. The cane of claim 1, wherein the first haptic feedback pattern comprises a pulsed feedback.

11. The cane of claim 1, further comprising a Doppler sensor integrated with the first TOF sensor and configured to send Doppler sensor signal data to the processor.

12. The cane of claim 1, further comprising a gyroscope placed above the first TOF sensor and configure to send gyroscope signal data to the processor.

13. A method for cane sweeping, the method comprising:
transmitting a first time-of-flight (TOF) beam from a first TOF sensor at a first end of a cane during the cane sweeping;
transmitting a second TOF beam from a second TOF sensor at the first end of the cane during the cane sweeping;
receiving signal data from the first TOF sensor and additional signal data from the second TOF sensor;
analyzing the received signal data and the received additional signal data via a processor of the cane;
in response to the analyzing indicating an obstacle is sensed within the first TOF beam, transmitting haptic feedback instruction from the processor to a haptic feedback generator disposed towards a second end of the cane distally opposite from the first end;
generating haptic feedback at the haptic feedback generator based on the transmitted haptic feedback instruction and to warn a user about the obstacle;
in response to the analyzing indicating an obstacle is sensed within the second TOF beam, transmitting additional haptic feedback instruction from the processor to the haptic feedback generator; and
generating further haptic feedback at the haptic feedback generator based on the transmitted additional haptic feedback instruction and to warn a user about the obstacle.

14. The method of claim 13, wherein the haptic feedback is provided in a first haptic feedback pattern and the further generated haptic feedback is provided in a second haptic feedback pattern different from the first haptic feedback pattern.

15. The method of claim 13, further comprising:
receiving signal data from a Doppler sensor of the cane;
determining, via the processor and based on the received signal data from the Doppler sensor, a direction of movement of the cane; and
controlling, via the processor, firing of the first and second TOF sensors based on the determined direction of movement of the cane.

16. The method of claim 13, further comprising:
receiving signal data from a gyroscope of the cane;
determining, via the processor and based on the received signal data from the gyroscope, a direction of movement of the cane; and
controlling, via the processor, firing of the first and second TOF sensors based on the determined direction of movement of the cane.

17. A method for cane sweeping, the method comprising:
receiving signal data from a first sensor connected to a cane;
analyzing the received signal data via a processor of the cane to determine a direction of movement of the cane;
selecting, based on the determined direction of movement of the cane, one of multiple time-of-flight (TOF) sensors disposed with the cane for firing;
using received TOF signal data from the one of the TOF sensors to detect an obstacle within a path of the cane.

18. The method of claim 17, wherein the first sensor is selected from a group consisting of a doppler radar sensor and a gyroscope.

19. The method of claim 13, wherein the first TOF sensor is disposed at a first position on the first end and the second TOF sensor is disposed at a second position on the first end, the second position being opposite from the first position.

20. The method of claim 19, wherein the first position is laterally opposite from the second position.

* * * * *